Nov. 14, 1961     F. C. CRESWELL     3,008,269

ROW CROP AND ORCHARD DEFROSTER

Filed Aug. 21, 1959

FRED C. CRESWELL
*INVENTOR.*

BY *Herbert J. Brown*

ATTORNEY

United States Patent Office 3,008,269
Patented Nov. 14, 1961

3,008,269
ROW CROP AND ORCHARD DEFROSTER
Fred C. Creswell, General Delivery, Covington, Tex.
Filed Aug. 21, 1959, Ser. No. 835,231
5 Claims. (Cl. 47—2)

This invention relates to agricultural implements and has reference to a mobile heater for row crops and orchards.

An object of the present invention is to provide a crop heater which may be used to protect both row crops and orchards from cold and frost.

Another object of the present invention is to provide a heating device for crops which is simple and economical in construction and which may derive power from a towing tractor.

A further object of the invention is to provide a crop defroster which may be adjusted for operation with plants of various sizes or in various stages of growth.

Another object of the present invention is to provide a heating device which may be operated at relatively high speeds in its normal use and which is capable of a high degree of maneuverability.

An additional object of the present invention is to provide an oil or liquid burner system for a crop defroster which utilizes a single tank and a single compressor in its operation.

These and other objects will become apparent from the following description and the accompanying drawings wherein.

Figure 1:
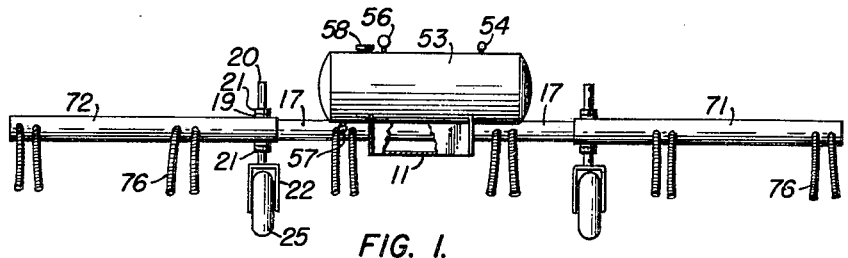
FIGURE 1 is a rear elevational view of the invention.
Figure 2:
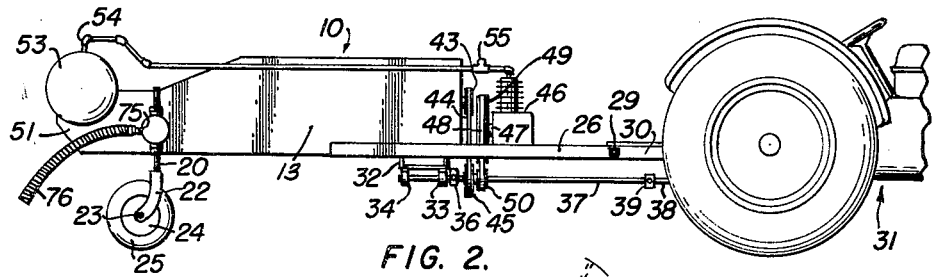
FIGURE 2 is a side elevational view of the invention showing its attachment to a farm type tractor.

In the drawing, a box-like heat chamber 10 constructed of steel is supported above ground in a position such that its base plate 11 and the forward portion of its upper plate 12 are parallel with the ground whereas enclosing side walls 13 and 14 and forward and rear walls 15 and 16 are vertical with respect thereto. The upper rearward portion of the heat chamber 10 is obliquely truncated so that the heat chamber is rearwardly tapered.

A tubular manifold 17 having its principal axis parallel to the ground is positioned within the rearward portion of the heat chamber 10 and opposite ends of the tubular manifold 17 project laterally outward of the heat chamber 10 through corresponding circular openings 18 in the side walls 13 and 14. Inwardly of the projecting ends of the tubular manifold 17 vertical sleeves 19 have a diameter less than that of the tubular manifold are respectively constructed through the manifold so that their vertical axes intersect the principal axis of the tubular manifold and so that their opposite ends project outwardly thereof. Vertical shafts 20 are respectfully received by the sleeves 19 in the tubular manifold 17. Collars 21 are peripherally and adjustably secured to the vertical shafts 20 adjacently above and beneath the sleeves 19 to limit vertical displacement of the shafts relative to the sleeves and to permit rotation of the shafts within the sleeves.

Generally U-shaped forks 22 are respectively connected at their upper ends to the lower ends of the vertical shafts 20, and extending ends of each fork project parallel to one another downwardly and obtusely with respect to the axis of the shaft. An axle 23 extends between and is attached to the ends of each fork 22, and a wheel 24 including pneumatic tire 25 is positioned between ends of each fork 22 and journaled on an axle 23. Thus, the heat chamber 10 is rearwardly supported by caster-like assemblies 20, 21, 22, 23, 24 and 25 pivotally secured within the vertical sleeves 19. Forwardly, the heat chamber 10 is supported by horizontal tongues 26 respectively secured to the side walls 13 and 14 of the heat chamber 10 and extending forwardly thereof to pivotal connections 29 with conventional double draw bar members 30 of a tractor 31.

A hanger 32 secured to the exterior surface of the lower plate 11 of the heat chamber 10 supports forward and rear bearings 33 and 34 adapted to receive a horizontal shaft 35 which is disposed generally parallel to the ground. A universal joint 36 connects the forward end of the horizontal shaft 35 to the rearward end of a spanning shaft 37 which is joined at its forward end to the power take-off shaft 38 of the tractor 31 by another universal joint 39.

A circular opening 40 is provided in the forward wall 15 of the heat chamber 10 and a fan 41 is positioned within the heat chamber 10 adjacent the circular opening. The fan 41 is supported on a shaft 42 which projects outwardly of the heat chamber 10 where a sheave 43 is mounted. A fan belt 44 rotatably connects the described sheave 43 with a sheave 45 of larger diameter secured to the spanning shaft 37. An air compressor 46 rests upon and is secured to a mounting plate (not shown) extending between the tongues 26 and is provided with a driven shaft 47 positioned above and parallel to the spanning shaft 37. A drive belt 48 rotatably connects a driven sheave 49 secured to the shaft 47 of the air compressor 46 to a driving sheave 50 on the spanning shaft 37.

Supporting members 51 and 52 constructed as rearward continuations of the side walls 13 and 14 are adapted to receive and support a cylindrical pressure tank 53 rearwardly of the heat chamber 10 and horizontally disposed with its axis parallel to the axis of the tubular manifold 17. An air line 54 provided with a check valve 55 communicates the interior of the pressure tank 53 with the pressure side of the air compressor 46. A pressure gage 56 is positioned on the uppermost surface of the pressure tank 53. A fuel outlet tap 57 is exteriorly positioned on the lowermost surface of the pressure tank 53. The pressure tank 53 has a filler cap 58.

A box-like combustion chamber 59 comprising parallel upper and lower rectangular plates 60 and 61 joined by side walls 62 and having a perforated forward plate 63 rests upon and is secured to a plurality of supporting rods 64 extending horizontally between interior surfaces of the side walls 13 and 14 of the heat chamber 10. An oil burner 65 of the pressure fed venturi type is positioned within the forward portion of the combustion chamber 59 and is oriented so that its discharge nozzle is rearwardly directed. A fuel preheating coil 66 comprising a helically formed metal tube is positioned rearwardly of the burner 65 in a disposition such that the discharge nozzle of the burner 65 is directed along the principal axis of the coil 66. One end of the preheating coil is connected to the oil intake fitting, not shown, of the burner 65, and the other end of the coil 66 communicates with the fuel outlet tap 57 of the pressure tank 53.

Figure 3:
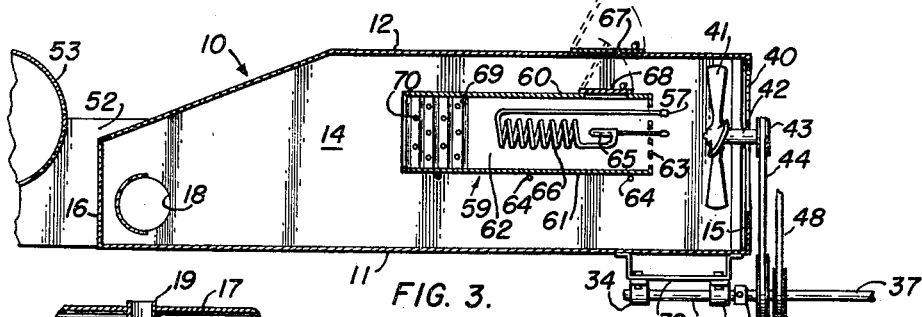
FIGURE 3 is a sectional side elevational view of the invention showing features of internal construction.
Figure 5:
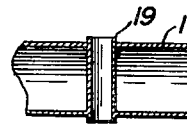
FIGURE 5 is a sectional rear elevational view of a portion of the tubular manifold illustrated in FIGURE 4.

Rectangular cover plates 67 and 68 in substantially vertical alignment with one another are respectively positioned over corresponding access ports in the upper plate 12 of the heat chamber 10 and in the upper plate 60 of the combustion chamber 59. As shown in FIGURE 3, each cover plate 67 and 68 is hingedly secured to the rearward edge of its respective access port. A heat diffusion grid comprising alternate rows of vertical and horizontal radiator bars 69 and 70 is constructed within the rearward portion of the combustion chamber 59.

Figure 4:
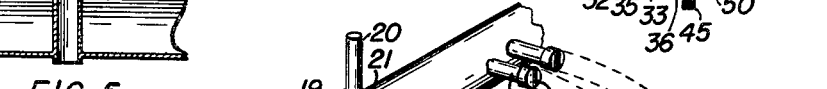
FIGURE 4 is a perspective view of the tubular manifold and alternate embodiment of the manifold extension member of the invention.
Figure 6:
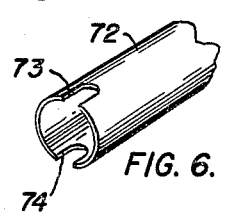
FIGURE 6 is a fragmentary perspective view of one end of the manifold extension member of the invention.

As shown in FIGURE 3, the forward portion of so much of the manifold tube 17 as is enclosed within the heat chamber 10 is cut away so that the manifold tube communicates with the interior of the heat chamber. Tubular manifold extensions 71 and 72 having interior diameters corresponding to the exterior diameter of the tubular manifold 17 are fitted over and project laterally from opposite ends thereof, and which manifold extensions are closed at their outer ends. Opposed lateral recesses 73 and 74 provided in one end of each manifold extension 71 and 72 receive the vertical sleeves 19 in the tubular manifold 17. Regularly spaced threaded nipples 75 arranged in pairs are attached to the rearward portion of the tubular walls of the manifold 17, and flexible metal hoses 76 engage the threaded nipples and depend therefrom. In an optional construction of the manifold extensions 71' and 72', as illustrated in FIGURE 4, outlet nipples 75 are deleted and an upwardly directed oval orifice 77 is formed in the outer end of each manifold extension. Caps 78 are provided for the nipples 75 in the tubular manifold 17 when the optional form of the manifold extensions 71' and 72' is used with the invention.

In operation, the tongues 26 are connected to the double draw bars 30 of a suitable farm tractor 31, and the universal joint 39 is connected to the tractor's power take-off shaft 38. The height of the rearward support of the invention is adjusted by attachment of the collars 21 to the vertical shafts 20 and the flexible hoses 76 are bent so that the heat is directed as desired. The pressure tank 53 is partially filled with fuel oil through removal of the pressure cap 58 which is then replaced. The engine of the tractor 31 is then started and the power take-off shaft 38 is set in rotation to drive the compressor 46 which pressurizes the tank 53.

The cover plates 67 and 68 are opened and a lighted rag or other combustible material is placed within the heating coil 66, and the cover plates are then closed. While the rag is still burning within the combustion chamber 59, the burner valve (not shown) is opened and adjusted so that the preheated fuel, vaporized by the burner, is ignited; thereafter heat within the combustion chamber 10 preheats liquid fuel flowing through the heating coil 66 to the burner 65 and combustion is sustained within the combustion chamber. Since only part of the air entering the heat chamber 59 passes through the combustion chamber 59, heated air ultimately delivered to plants is a mixture of heated and unheated gases of such composite temperature as will not scorch or burn a crop. Mixture of gases is promoted by the radiator rods 70 in the rearward portion of the combustion chamber 59 and by the shape of the rearward portion of the heat chamber 10 which accelerates gases passing out thereof.

The paired spacing of the flexible hoses 76 along the manifold 17 and the manifold extensions 71 and 72 provide for delivery of heat directly to opposite sides of row crop plants. Concentration of delivered heat to crop rows permits the invention to be towed at relatively high speeds through a planted field without great loss of effectiveness. Horizontally rigid attachment to the towing tractor and castered wheel supports permit rapid maneuvering at the end of each row with short turning radius.

The invention is not limited to the exemplary constructions herein shown and described, but may be made in various ways within the scope of the appended claims.

What is claimed is:

1. A mobile plant heater comprising a heat chamber, a horizontally disposed manifold communicating with and extending from said heat chamber, casters supporting said manifold in spaced relationship with the ground, spaced pairs of bendable hoses communicating with said manifold and depending therefrom to near the ground, means forcing heated air from said heat chamber outwardly through said manifold and said hoses, and means attaching said plant heater to a towing vehicle.

2. A crop and orchard heater comprising a heat chamber having forward and rear ends, an opening in said forward end of said heat chamber, a manifold connecting with the rearward portion of said heating chamber and projecting laterally of opposite sides thereof, means forcing air into said heat chamber through said opening in the forward end thereof, a combustion chamber positioned within said heat chamber, at least one opening in the forward end of said combustion chamber, a burner positioned within said combustion chamber, a fuel line coil communicating with said burner and positioned within the flame path of said burner, a tank exteriorly secured to said heat chamber and containing fuel and pressurized air thereabove, means conducting said fuel to said fuel line coil, means maintaining air pressure in said tank, means connecting said heat chamber to a towing vehicle, and casters supporting said manifold in a spaced relationship with the ground.

3. The invention as defined in claim 2 and wherein said means maintaining air pressure in said tank includes an air compressor, and means rotatably connecting the shaft of said air compressor to a power take-off shaft of said towing vehicle.

4. The invention as defined in claim 1 and including lateral extension member detachably secured to opposite ends of said manifold and having upwardly formed orifices in their outer ends, and detachable means closing said communication of said flexible hoses with said manifold.

5. A towed crop and orchard heater comprising: a heat chamber, combustion means within said heat chamber, an opening in said heat chamber, a fan rotatably mounted in said opening in said heat chamber, drive means connecting said fan to the power take-off of a towing vehicle, a horizontally disposed manifold communicating with and extending laterally from said heat chamber, casters supporting said manifold in spaced relationship to the ground, and spaced pairs of flexible hoses communicating with said manifold and depending therefrom to proximity with the ground.

References Cited in the file of this patent

UNITED STATES PATENTS

| 937,952 | Hardinge | Oct. 26, 1909 |
| 2,153,900 | Taber | Apr. 11, 1939 |
| 2,154,002 | Kerrick | Apr. 11, 1939 |